Dec. 26, 1939.   M. O. MARSH   2,185,032
ELECTRICAL APPARATUS CASING
Filed July 27, 1937
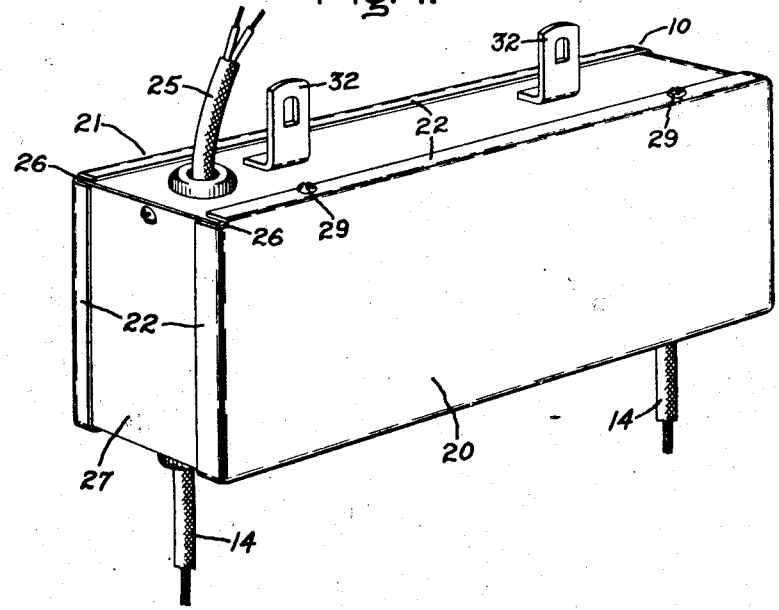
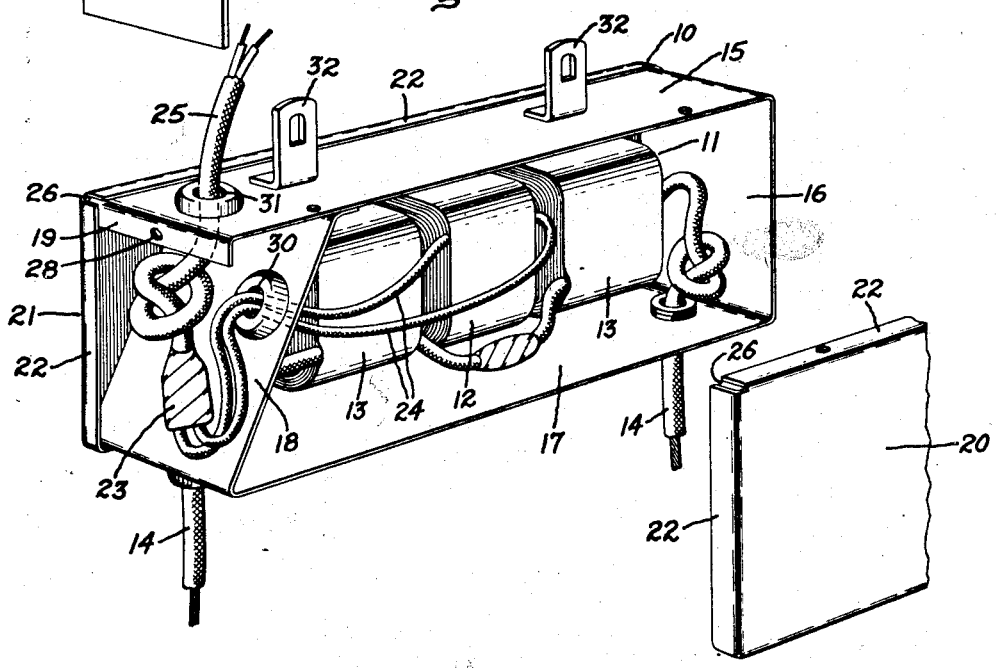
Inventor:
Myrle O. Marsh,
by Harry E. Dunham
His Attorney.

Patented Dec. 26, 1939

2,185,032

UNITED STATES PATENT OFFICE 2,185,032

ELECTRICAL APPARATUS CASING

Myrle O. Marsh, Fort Wayne, Ind., assignor to General Electric Company, a corporation of New York Application July 27, 1937, Serial No. 155,934

2 Claims. (Cl. 220—3.2)

My invention relates to casings for electrical apparatus such as transformers, reactors and condensers and of the type in which a partition separates the interior of the casing into one compartment for the apparatus and another compartment wherein connections may be made between the apparatus and an external electric circuit. The invention is particularly applicable in connection with transformers for operating gaseous tube signs. Such transformers are usually supplied with current from an ordinary low voltage commercial circuit but it is necessary that the secondary voltage supplied to the gaseous tube sign be very much higher. It is therefore desirable that a partition separate and protect the connections in the low voltage transformer leads from the high voltage secondary leads and the high voltage parts of the transformer.

The general object of the invention is to provide an improved electrical apparatus casing with an easily accessible connection compartment separated by a simple and easily constructed partition from a second compartment for the apparatus.

The invention will be better understood from the following description taken in connection with the accompanying drawing in which Fig. 1 is a perspective view of a transformer casing constructed in accordance with the invention, and Fig. 2 is a similar perspective view with parts of the casing removed to reveal details.

Like reference characters indicate similar parts in both figures of the drawing.

The casing 10 shown in the drawing is formed of suitable sheet metal and encloses a transformer 11 having a low voltage primary winding 12 and a high voltage secondary winding 13 formed in two sections connected in series between the high voltage secondary leads 14 to which a gaseous tube sign or other suitable load may be connected. The casing 10 includes only four main sheet metal parts. The top face 15, one end face 16, the bottom face 17 and the partition 18 are formed from a single piece of sheet metal of substantially uniform width, this strip being bent at right angles between the end face 16 and the top and bottom faces 15 and 17 at an acute angle between the bottom face 17 and the partition 18. The partition 18 is somewhat longer than the distance between the top face 15 and the bottom face 17 so that the upper end of the partition rests against the inner surface of the top face 15 to which it may be secured by welding. The end of the top face 15 opposite the end face 16 is bent inwardly to form a narrow flange 19. The side faces 20 and 21 of the casing are similar rectangular pieces of sheet metal with their edges bent over at right angles to form narrow flanges 22 fitting around the top, bottom and ends of the casing. The partition 18 separates the interior of the casing 10 into one compartment for the transformer 11 and another compartment for concealing the connections 23 between the low voltage leads 24 of the transformer and the outside conductors 25 for connecting the transformer to a suitable primary source of current. The flange 19 on the top face 15 of the casing is spaced slightly from the adjacent flanges 22 of the side faces of the casing and narrow slots or notches 26 are formed in the flanges 22 to receive a simple, rectangular sheet metal cover 27 to close the connection compartment. This cover 27 slides down between the flange 19 and the adjacent end flanges 22 until its lower edge is held in place between these flanges 22 and the lower end of the partition 18. The cover 27 may be secured in closed position by a machine screw inserted through a hole in this cover and threaded into an opening 28 in the flange 19. The side faces 20 and 21 may be secured in position by welding or at least one of them may be secured by machine screws 29 so as to be easily removable. The low voltage leads 24 of the transformer extend into the connection compartment through an opening 30 in the partition 18 and the outside conductors 25 extend into this connection compartment through an opening 31 in the top face 15 of the casing. Hanger lugs 32 may be welded to the top face 15 of the casing so that it may be easily suspended from a suitable support.

The invention provides an electrical apparatus casing which is extremely simple and economical in construction and in which the connections between the apparatus and an external circuit are effectively protected from the apparatus and are entirely concealed but easily accessible.

The invention has been explained by describing and illustrating a particular transformer casing and a method for producing it, but it will be obvious that changes may be made without departing from the spirit of the invention and the scope of the appended claims.

What I claim as new and desire to secure by Letters Patent of the United States, is:

1. An electrical apparatus casing including three sheet metal faces, two sheet metal covers having edge flanges fitting around said faces and forming two more faces, said flanges having notches adjacent an end of one of said three faces, and a removable sheet metal cover fitting through said notches to form another face of the casing.

2. An electrical apparatus casing including three sheet metal faces, a partition extending at an acute angle from one end of one of said faces to separate the interior of the casing into apparatus and connection compartments, two sheet metal covers having edge flanges fitting around said faces and forming two more faces, said flanges having notches adjacent an end of one of said three faces, and a removable sheet metal cover fitting through said notches and against said partition to form another face of the casing.

MYRLE O. MARSH.